(No Model.) 2 Sheets—Sheet 1.

O. D. WOODRUFF.
MEAT CUTTER.

No. 482,146. Patented Sept. 6, 1892.

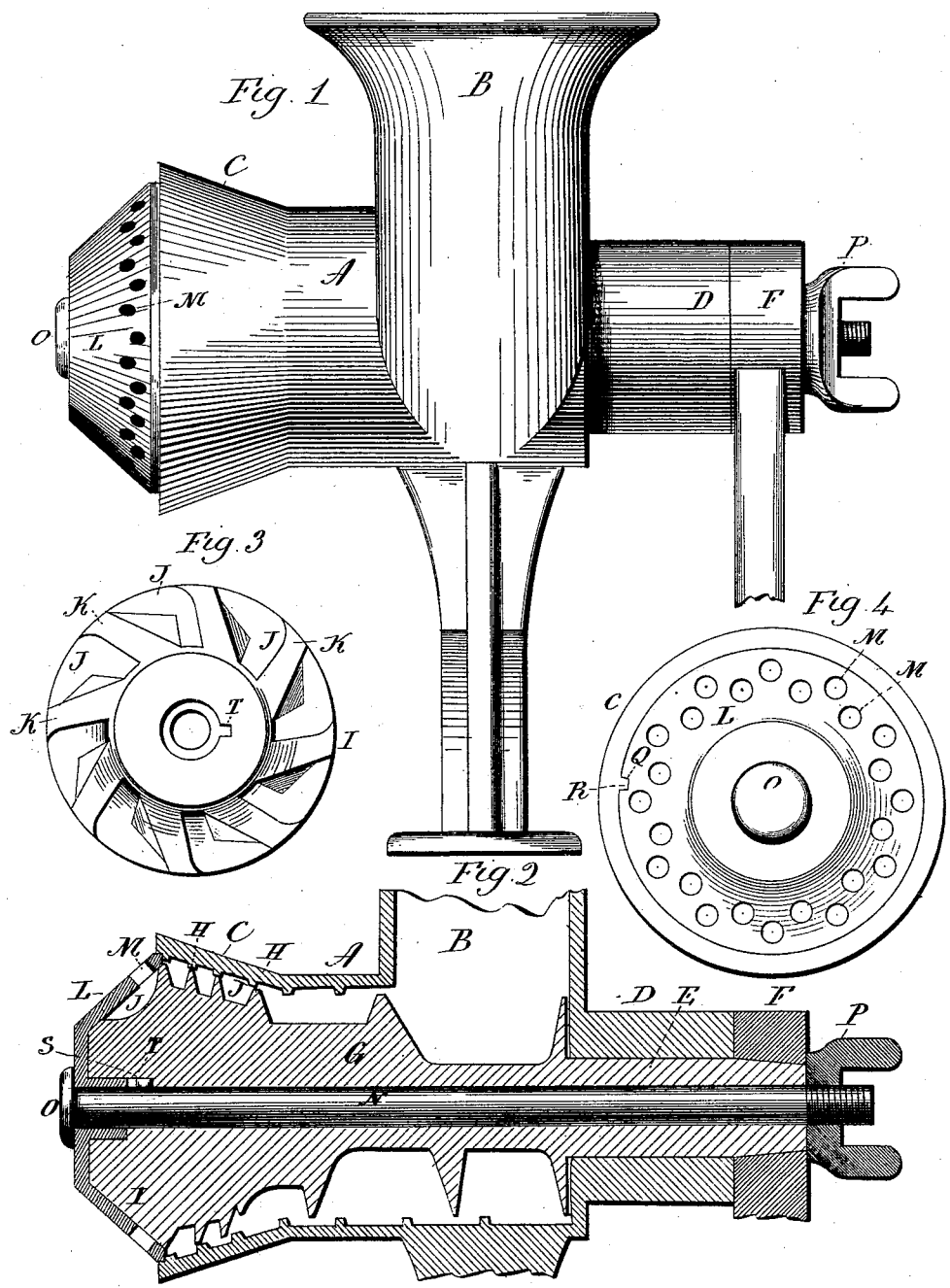

UNITED STATES PATENT OFFICE.

OLIVER D. WOODRUFF, OF SOUTHINGTON, CONNECTICUT.

MEAT-CUTTER.

SPECIFICATION forming part of Letters Patent No. 482,146, dated September 6, 1892.

Application filed May 31, 1892. Serial No. 434,862. (No model.)

*To all whom it may concern:*

Be it known that I, OLIVER D. WOODRUFF, of Southington, in the county of Hartford and State of Connecticut, have invented a new Improvement in Meat-Cutters; and I do hereby declare the following, when taken in connection with accompanying drawings and the letters of reference marked thereon, to be a full, clear, and exact description of the same, and which said drawings constitute part of this specification, and represent, in—

Figure 5:
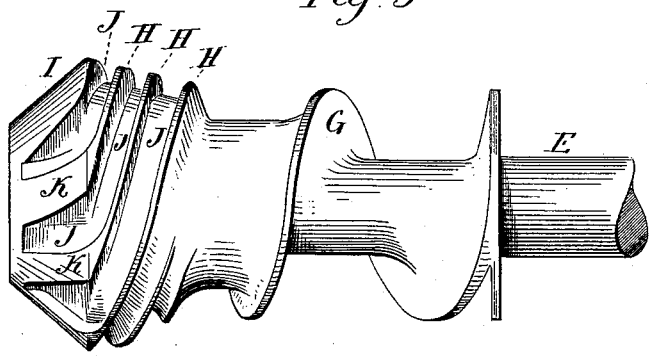
Figure 6:
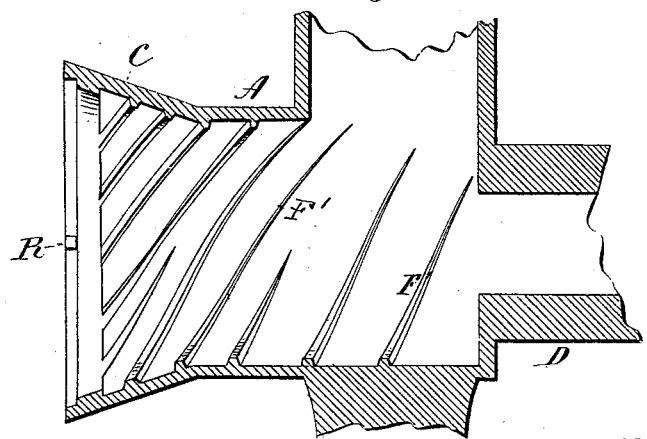
Figure 7:
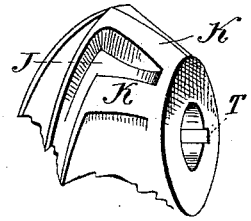

Figure 1, a side view of the machine; Fig. 2, a longitudinal central section; Fig. 3, an end view of the follower detached; Fig. 4, an end view of the machine, looking toward the perforated plate; Fig. 5, a side view of the follower detached; Fig. 6, a longitudinal central section of the case with the follower and perforated plate removed; Fig. 7, a perspective view of a portion of the cutting end of the follower, and Figs. 8 and 9 modifications.

This invention relates to an improvement in that class of meat-cutters which consists of a case having a spiral follower arranged longitudinally therein, with a hopper at one end of the case for the introduction of meat and a discharge at the opposite end of the case for the delivery of meat, and in which the rotation of the spiral follower drives the meat through the case, and particularly to that class in which the follower and case are provided with cutting devices, so that as the meat passes through the case under the rotation of the follower it will be cut or hashed between the case and follower, and also in which a supplemental cutting device is employed to produce a final cutting on the meat after it shall have have been preliminarily cut between the follower and case and before the delivery of the meat from the machine.

In many of the machines of this character the supplemental cutting devices are detached and separate from the feed-screw or follower, making a number of parts which are liable to be misplaced when putting the machine together for work or lost in the operation of cleaning, and such independent cutting devices also increase the difficulty in cleaning the machine as well as prevent the delivery of all the meat from the machine, a very considerable portion being left in the machine after it has done its work to the fullest extent.

The object of the invention is to combine the preliminary and the supplemental cutters in a single structure, whereby the machine is greatly simplified in construction, easily separated, cleaned, and reassembled, and will produce substantially a complete delivery of the meat from the machine; and the invention consists in the construction of the machine as hereinafter described, and particularly recited in the claims.

A represents the body of the case, which is preferably made of cylindrical shape. At one end the hopper B is arranged, preferably formed as a part of the case and opening into the case, as seen in Fig. 2, so that the meat may be introduced through the hopper into the case in the usual manner. The end of the case opposite the hopper is preferably made flaring, as at C, so that the internal diameter of the case increases toward the delivery end. At the hopper end of the case a longitudinal projection D is formed as a bearing for the arbor E and through which the arbor extends, the arbor being adapted to receive a crank F or other means for imparting power, and by which rotation may be imparted to the arbor.

The arbor extends into the machine and forms a follower G, having a spiral rib, as seen in Fig. 5, as usual in such followers for meat-cutters, so that by the rotation of the follower the meat received through the hopper will be forced longitudinally through the case. The interior of the case is constructed with spiral ribs F', which coact with the spiral rib of the follower to aid in the forcing of the meat through the case, but toward the delivery end of the case, and preferably in the flaring portion C, the ribs are made near together, so as to leave but a short distance between adjacent ribs. These ribs form stationary cutters within the case near the delivery end. The follower on that portion which corresponds to the flaring part C of the case is also constructed with numerous spiral ribs H and which run in close contact with the corresponding ribs in the case, the ribs H on the follower and the corresponding ribs in the case all running spirally around the respective parts and toward the delivery end, so that as the follower revolves the cutting-ribs H of the follower will work across the cutting-ribs within the case, and thereby operate as cutters to cut the meat as it is forced by the follower between these cutting-ribs. To the end that these cutters shall work satisfactorily, care should be taken not only that the ribs of the follower run in close contact with the ribs in the case, but they should present sharp shear-like cutting-edges one to the other, that the cutting may be easily performed and with the minimum amount of power.

The delivery end of the follower is reduced in diameter into conical form, as seen at I, Fig. 5, and the grooves J, formed by the ribs H, turn downward and outward over the conical surface I, as seen in Figs. 2, 5, and 7, so as to produce substantially a continuation of the ribs H on the conical face, which continuation of the ribs form substantially radial cutters K on that conical surface of the follower, and, as seen in Figs. 2, 5, and 7, these cutters present an abrupt or sharp cutting-edge in the direction in which the follower is caused to revolve, and the space between the cutters forms recesses, into which the meat preliminarily cut by the spiral ribs H may pass.

At the delivery end of the case and outside the conical portion of the follower which carries the cutters J, a plate L is applied, its internal shape corresponding to the shape of the end of the follower and so that that end of the follower may run in close contact with the plate. The plate has numerous perforations M formed therein, across which upon the inside the cutters K will work as the follower revolves.

The plate is firmly secured to the end of the case in any suitable manner, here represented as by means of a bolt N, running longitudinally through the plate and through the follower, the bolt having a head O to bear against the outside of the plate, and the bolt is provided with a nut P at its opposite end, by which the plate may be drawn or adjusted against the end of the follower. The plate is prevented from rotation by any suitable means, here represented as by a notch Q in the periphery of the plate (see Fig. 4) and a corresponding inward projection R in that part of the case into which the plate sets, as seen in Fig. 6, this being a common expedient for preventing the rotation of the plate. The bolt N should be coupled with the follower, so as to revolve therewith, and this may be done by a stud or projection S on the shaft extending into a corresponding notch T in the follower, as seen in Figs. 2 and 3.

The parts of the machine are assembled, as seen in Fig. 2, the crank applied, and the nut P turned to bring the follower into its proper adjustment with relation to the plate L, so that the cutters on the end of the follower may run in the proper relation to the inner surface of the said plate L. The crank bears against the end of the case to which it is attached, so that the nut bearing against the outer surface of the crank and the crank against the end of the case the follower is drawn into the case so as to bring the expanding and cutting portion of the follower into proper relation with the corresponding internal surface of the case, so that the cutting parts may work in their proper relation to each other. Thus arranged meat is introduced through the hopper B in the usual manner and the follower caused to revolve. The meat is driven by the spiral blade of the follower through the case and into the space occupied by the spiral cutters on the follower, and there as it passes through it is cut or hashed. Thence the meat passes from the grooves between the cutters on the follower into the spaces J between the cutters K K on the end of the follower and against the perforated plate L. The advancing force being continued by the rotation of the follower, the meat is forced into the perforations of the plate, and as the cutters K revolve across the inner surface of the plate and over the perforations therein it cuts from the mass that portion of the meat which is forced into the perforations, so that the meat under the continued force will escape through the perforations and drop from the machine completely and perfectly cut. The preliminary cutting produced between the spiral ribs on the follower and the corresponding spiral ribs in the case so reduces and hashes the meat that it is well prepared for easy passage into the perforations in the plate, and the supplemental cutting produced by the cutters K on the end of the follower completes the hashing in the most perfect manner, the meat freely passing through the perforations as it is cut or hashed.

By constructing the follower with the cutters which work against the inner surface of the plate as an integral part of the follower, instead of making the said cutters independent of the follower, the number of parts of the machine is reduced and the cost of manufacture is also very greatly reduced. Again, because of this construction there is very little space within the machine which can be occupied by the meat when the operation of the machine is completed, the forcer or follower driving the meat into the spaces between the plate-cutters K, so that when the machine has finished its work there will be little or no meat within the case back of said spaces between the plate-cutters. As the plate-cutters and the preliminary cutters are all in a single piece with the follower, the machine is readily cleaned and without liability of losing the parts, which unavoidably occurs where the supplemental cutters are made detached from the follower.

The formation of the plate-cutters as a part of the follower to work in direct or close contact with the inner surface of the plate may be employed in machines of this class in which there is no preliminary cutting, so that substantially all the cutting which the machine performs will be made between the cutters on the end of the follower and the perforated plate, the grooves on the follower running into the grooves on the end of the follower between the cutters, as I have described, the arrangement of the forcing-ribs on the follower being such that they would produce no other effect upon the meat than that which is incident to the forcing forward or advance of the mass of meat through the case.

Figure 8:
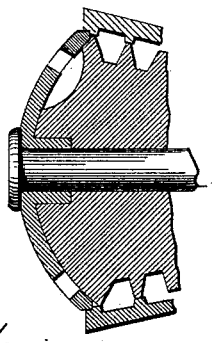
Figure 9:
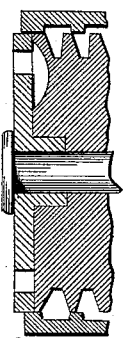

While preferring to make the perforated plate conical and the plate-cutters on the follower of corresponding shape, the internal shape of the plate may be varied—as, for illustration, it may be concave, as seen in Fig. 8—the cutters on the end of the follower being of corresponding shape, or the plate may be flat, as seen in Fig. 9, the cutters on the end of the follower being of corresponding shape. It will be evident that some preliminary cutting effect as well as the cutting effect of the plate will be the same whether the case be constructed flaring or increasing in diameter toward its delivery end or not. The invention is therefore not to be understood to be limited to such flaring character of the case and follower.

I claim—

1. In a meat-cutter, the combination of a case having a hopper for the introduction of the meat at one end, a spiral follower arranged within the case, the case near its delivery end constructed with internal spiral ribs and the follower with corresponding spiral ribs adapted to operate as cutters upon said spiral ribs within the case, and the spiral ribs on the follower forming grooves between them, the said grooves continued over the delivery end of the follower producing ribs between the grooves which form cutters, combined with a stationary perforated plate, against the inner surface of which the said cutters on the end of the plate will bear, and means for imparting rotation to said follower, substantially as described.

2. The combination of a case having a hopper for the introduction of meat at one end, the opposite end of the case flaring and constructed with spiral ribs upon its inside around said flaring portion, a spiral follower within said case and adapted to revolve therein, the follower extending through the flaring portion of the case and in that flaring portion of the case the follower constructed with a series of spiral ribs coacting with the ribs in the case as cutters, the ribs on the follower producing grooves between them, which grooves are continued over the end of the follower, thereby forming substantially radial cutters on the end of the follower, and a stationary perforated plate in the delivery end of the case, against the inner surface of which the said radial cutters on the follower are adapted to work, substantially as described.

3. The combination of a case having a hopper at one end for the introduction of meat, a spiral follower within the said case, the interior of the case toward its delivery end constructed with spiral ribs upon its inside and the follower constructed with corresponding spiral ribs adapted to co-operate with the spiral ribs in the case as cutters and so as to produce a preliminary cut upon the meat passing through the case, the outer end of the follower of conical shape, the grooves between the said spiral cutting-ribs of the follower continued onto the said conical surface on the end of the follower and so as to form grooves therein, producing cutters on the said conical end of the follower, with a perforated plate outside the end of the follower and of an internal shape corresponding to the conical end of the follower, the said plate stationary and so that the cutters on the said conical end of the follower may work in close contact with the inner surface of said perforated plate, substantially as described.

4. The combination of the case A, having a hopper B for the introduction of the meat at one end, a spiral follower G, arranged longitudinally within the case and extending through the hopper end of the follower and provided with means for imparting revolution to the follower, the interior of the case toward its delivery end constructed with a series of spiral ribs, the follower upon its surface also constructed with a series of spiral ribs corresponding to the spiral ribs on the interior of the case, the ribs on the follower being adapted to coact with the ribs of the case as preliminary cutters, the grooves formed by the said spiral ribs on the follower continued over onto the end of the follower and so as to produce substantially radial ribs therein to serve as cutters, a perforated plate outside the end of said follower and connected to the case so as to be held stationary against revolution with the follower, a bolt longitudinally through the perforated plate and follower, with a nut upon the opposite end of the follower, adapted through said bolt to draw the perforated plate against the end of the follower, substantially as described.

5. In a meat-cutter, the combination of a case having a hopper for the introduction of meat at one end, a spiral follower arranged longitudinally in the case and so as to revolve therein and adapted to force the meat introduced through the hopper toward the opposite end of the case, a stationary perforated plate on the delivery end of the case, and the follower constructed with radial cutters on the delivery end corresponding to and adapted to work against the inner surface of the perforated plate, the said cutters being made an integral part of the follower, substantially as and for the purpose described.

In testimony whereof I have signed this specification in the presence of two subscribing witnesses.

OLIVER D. WOODRUFF.

Witnesses:
FRED C. EARLE,
GEORGE D. SEYMOUR.